Jan. 18, 1966 A. A. BIEN 3,229,363
METHOD OF MANUFACTURE AND ASSEMBLY OF FASTENING DEVICE
Original Filed Jan. 18, 1961 2 Sheets-Sheet 1
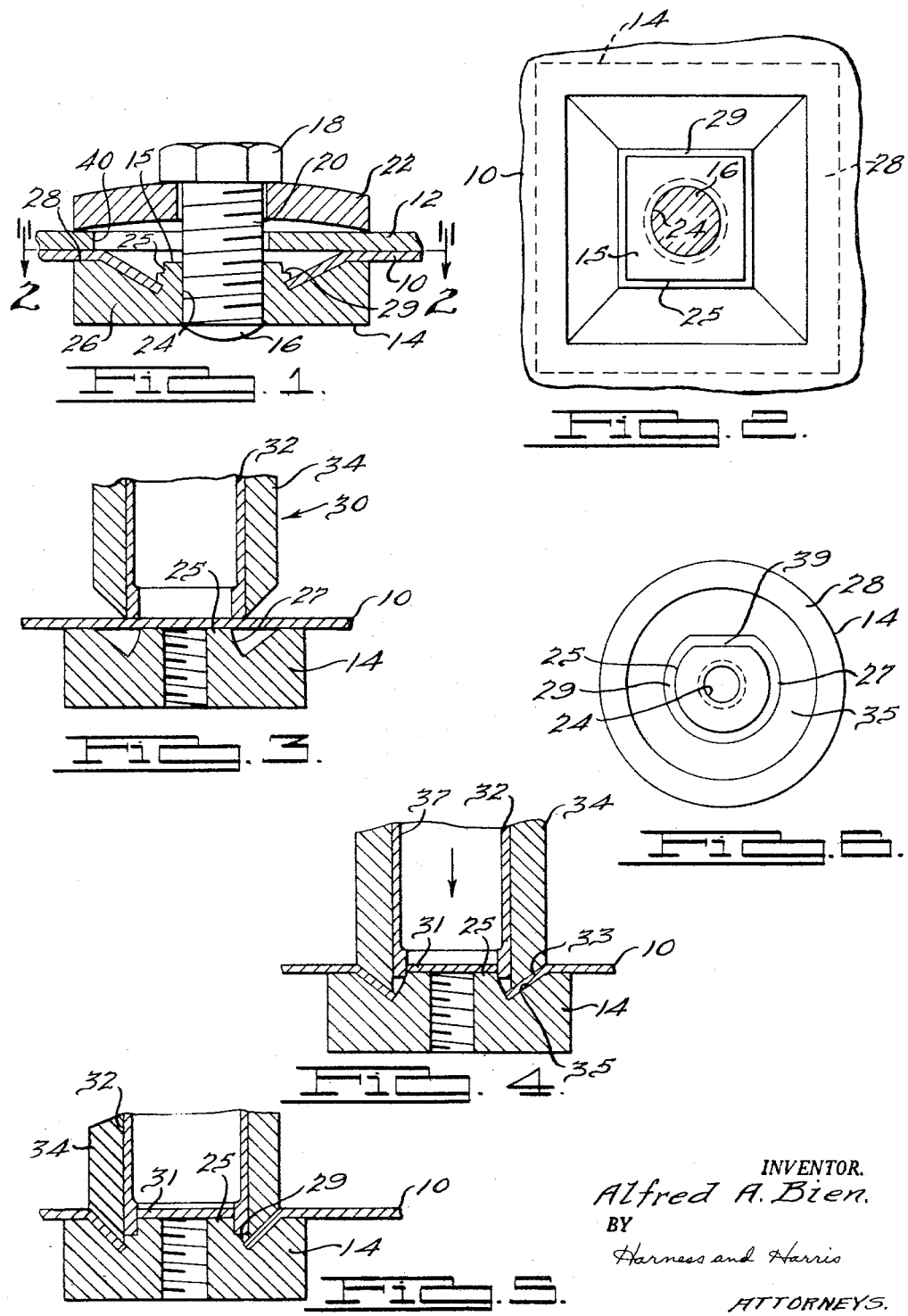
INVENTOR.
Alfred A. Bien.
BY
Harness and Harris
ATTORNEYS.

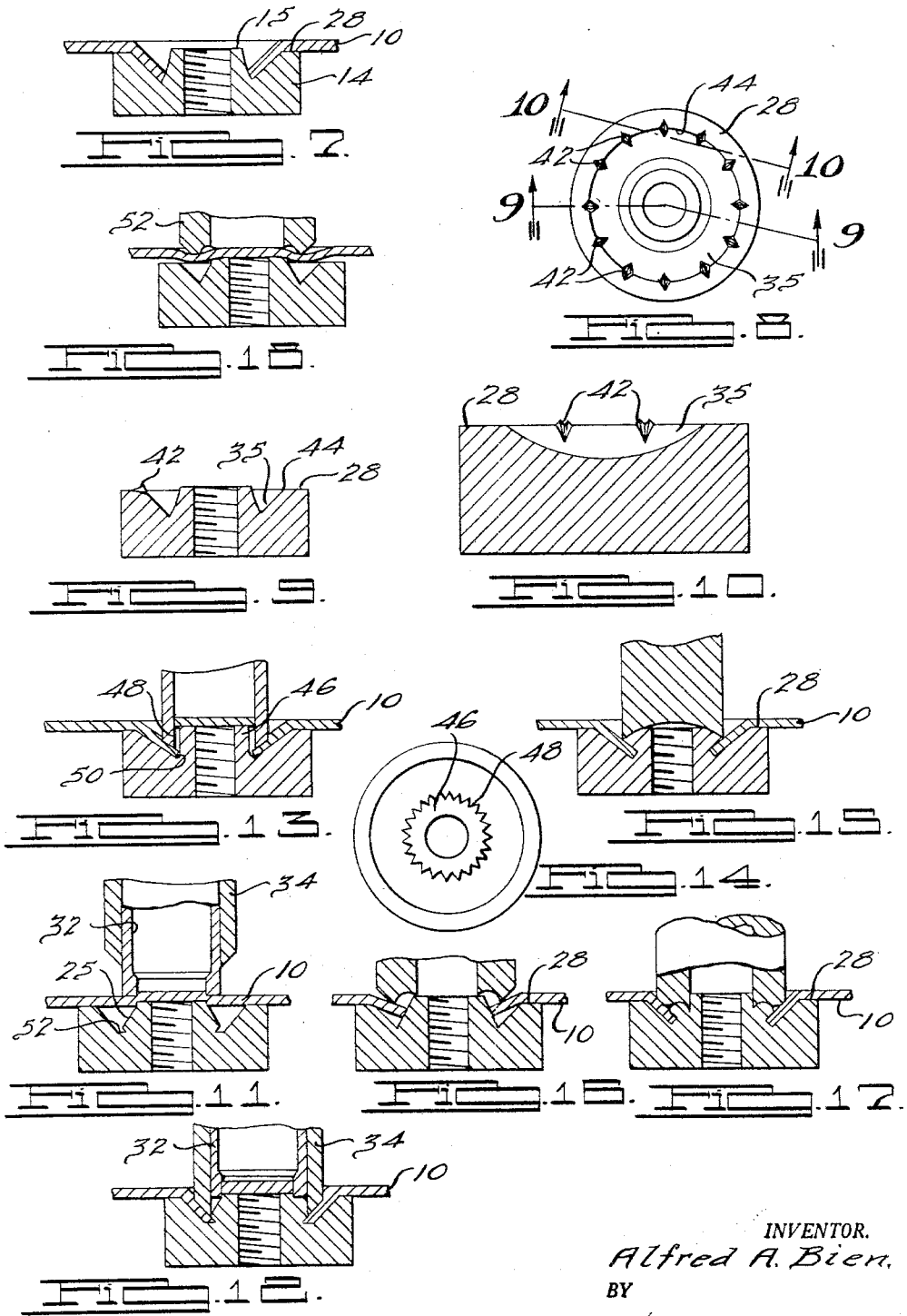

United States Patent Office 3,229,363
Patented Jan. 18, 1966

3,229,363
METHOD OF MANUFACTURE AND ASSEMBLY OF FASTENING DEVICE
Alfred A. Bien, Dearborn, Mich., assignor to Chrysler Corporation, Highland Park, Mich., a corporation of Delaware
Original application Jan. 18, 1961, Ser. No. 84,480. Divided and this application June 15, 1961, Ser. No. 117,383
4 Claims. (Cl. 29—432)

This invention relates to a method of manufacture of a nut and its attachment to sheet material. This application is a division of my application Serial No. 84,480 which was filed January 18, 1961, now abandoned, which, in turn, was a continuation-in-part of application Serial No. 32,434 filed May 27, 1960, now abandoned in the name of Alfred A. Bien, entitled Load Bearing Nut and Method of Manufacture and Assembly.

Heretofore the compression of two or more pieces or sections of sheet metal has been accomplished by means of bolt and nut assemblies wherein no cooperating structure of the bolt and nut has been provided for compressing the sheet metal pieces together at a considerable distance from the bolt shank on all sides thereof. The result is that the bolt head or washer thereunder is pulled toward the nut until either one piece of the sheet metal is compressed between the bolt head and the nut and not against the other sheet metal pieces, or until the bolt head and the nut bottom out against each other. The result is that the desired immovablity of the sheet metal sections caused by the clamping effect of the nut and bolt is not achieved and in the cases of automobiles and other structures undergoing considerable vibration, scratching and screeching of the metal sections as they rub together and consequent loosening of the bolt and nut assembly become readily noticeable.

Another object is to provide novel methods for attaching the nut of the aforesaid assembly to one section of the sheet metal prior to its assembly with the other sheet section or sections.

A specific object is to provide a nut blank having a tapered attaching post for attachment of the nut to a plate by deformation of said post into locking engagement with the plate.

A further object is to provide die means for making the above attachment of the nut to the plate.

Further objects and advantages of the present invention will become apparent from the following description and drawings in which:

FIGURE 1 is a cross-sectional view of the nut and bolt assembly of the present invention assembled with sheet metal sections;

FIGURE 2 is a plan view of the staked nut of FIGURE 1 taken along line 2—2 in the direction of the arrows;

FIGURE 3 represents an initial stage of the assembly of the sheet metal to the nut;

FIGURE 4 represents the punching and sheet bending of the assembly process;

FIGURE 5 represents the nut deforming final stage of the assembly process;

FIGURE 6 is a view of a modified form of nut;

FIGURE 7 illustrates another modified form of nut wherein a longer attaching post is utilized;

FIGURE 8 is a plan view of a nut provided with anti-rotation projections;

FIGURE 9 is a view of FIGURE 8 taken along line 9—9 in the direction of the arrows;

FIGURE 10 is a view of FIGURE 8 taken along line 10—10 in the direction of the arrows;

FIGURE 11 represents a variation in post design;

FIGURE 12 represents an intermediate attaching step of the nut of FIGURE 11;

FIGURE 13 represents a variation in attaching post design;

FIGURE 14 is an end view of the attaching post of FIGURE 13;

FIGURE 15 represents a heading method for attaching the nut to a pre-pierced sheet;

FIGURE 16 represents novel die structure and the initial step in attaching a nut to a pre-pierced sheet;

FIGURE 17 represents the completed operation of FIGURE 16; and

FIGURE 18 represents a single die punching and attaching operation.

Referring to the drawings, sheet metal sections 10 and 12 are clamped together by nut 14 and bolt 16. The bolt is of conventional structure having a head 18 and a threaded shank 20. A washer 22 of any desired thickness may be employed underneath the head 18, or the head 18 itself may be made of any desired dimension so as to eliminate the need for a washer. The nut 14 which may be rectangular as shown in FIGURES 1-5 or circular as shown in FIGURE 6 or of any other desired shape including disc shape is comprised of a threaded portion 24, an attaching post 25, a connecting portion 26, and a flange or load bearing portion 28. The sloping portion 27 of post 25 may be arcuate as shown in FIGURES 1-10 or may be straight as shown in FIGURE 16. If it is arcuate, less friction is developed in bending the sheet 10 to the bottom of recess 35. The nut is preferably of steel that is work hardenable. As shown in FIGURES 1-5 outward end 15 of post 25 does not extend beyond the plane of bearing portion 28 and will not, therefore, bottom out against sheet 12 should said sheet be misaligned as shown in FIGURE 1. It is obvious, however, that sheet 12 would not bottom out against end 15 of attaching post 25 if end 15 is just below the plane of sheet 12, and where sheet 10 is of relatively thick metal as shown in FIGURES 7-17, the projection of end 15 slightly above bearing portion 28 would not impair the operation of the nut and in fact would facilitate the punching of the slug 31 from sheet 10. It is further obvious that as the thickness of sheet 10 decreases the end 15 must be lowered with respect to portion 28 since the distance between sheet 12 and end 15 also decreases and a slight amount of pulling through of washer 22 would then cause bottoming out of the washer and sheet 12 on end 15. Moreover, if the washer 22 is relatively thick and unyielding, end 15 may then be moved closer to sheet 12 since the chances of bottoming out decreases.

In attaching nut 14 to sheet metal 10 a double acting punch 30 is provided and comprises an inner sleeve 32 reciprocable in an outer sleeve 34. Both sleeves are formed to correspond to the shape of attaching post 25 whether it be of the shape of FIGURES 2, 6, 8, 14, or some other shape. The post 25 is provided with a straight or curved sloping portion 27 which being larger in diameter than sleeve 32 is formed thereby into a shoulder 29 (FIGURE 1) as explained below.

The first step in attaching any of the nuts shown to a sheet by the self-piercing technique is to cause sleeve 32, in cooperation with post 25, to punch a slug 31 from sheet 10. It is to be understood that the nut is supported on an anvil during the piercing and forming operations described herein. The use of an anvil follows general commercial practice. Sleeve 32 is then idled as shown in FIGURE 4 while sleeve 34 bends the flange 33 of sheet 10 tightly into the recess 35 in the nut. Sleeve 32 is then actuated as shown in FIGURE 5 to stake or forge the sloped portion 27 into the shoulder 29. As much of slope 27 may be used to form shoulder 29 as is necessary to hold sheet 10 onto the nut and it is obvious that shoulder 29 need not extend all the way around post 25. Sleeve 32 may have a recessed bore 37 as shown to facilitate removal of the slugs 31. The flat portion 39 of the post in FIGURE 6 is provided to prevent rotation of the nut in the sheet 10.

The sheet metal 12 is provided with a relatively large aperture 40 so that the normal misalignments of the sheet metal during assembly on automobiles, for example, can be compensated for without having to provide new apertures at considerable cost and at the expense of structural soundness.

The large aperture 40 would normally allow the nut and bolt to bottom out either against themselves or against one section of the sheet metal, but, as shown in applicant's FIGURE 1 the washer 22 and flange portion 28 of the nut compress between them the sheet metal 10 and 12 and there is no chance for the washer 22 and the nut 14 to bottom out against themselves or a single section of the sheet metal.

As shown in FIGURES 8–10, a plurality of projections 42 may be provided on the edge 44 of the nut recess 35 or any place on face 28 or recess 35.

In FIGURES 13 and 14 a straight post 46 is shown provided with splines 48 into which the edge 50 of apertured sheet 10 may be extruded to provide anti-rotation structure. The post 46 may then be headed over in any number of ways, examples of which are shown in FIGURES 15 and 17.

The die structures shown in FIGURES 15–17 are especially useful in attaching nuts to sheets having attaching post holes pre-punched therein. It is noted, however, in FIGURE 18 that the single die 52 can punch the aperture in the sheet and also deform the post into locking engagement with the sheet.

In FIGURES 11 and 12, the nut post 25 is provided with a groove 52 into which the edge of sheet 10 is extruded prior to the final forging operation of die 32 as shown in FIGURE 5.

It has been found that the compression of the two or more sections of sheet metal by this nut and bolt arrangement is of a magnitude far exceeding that achieved by conventional nuts and bolts when used on sheet metal of the construction shown herein.

I claim:

1. A method of attaching a metal nut to a deformable sheet wherein the nut is provided with a recessed face portion and a centrally threaded attaching post projecting from the recess and having an exterior surface and a radially enlarged lower portion, comprising the steps of placing said sheet over the outer end of said attaching post, forcing a first hollow die over said end of said post to punch a slug from said sheet to define an aperture, moving a second hollow die surrounding said first die to force portions of said sheet adjacent the above mentioned aperture into the recess in the nut face to points adjacent said lower portion of said post, and subsequently moving said first hollow die to deform metal from the exterior surface only of said post and force such deformed metal into overlying position with respect to said portions of said sheet around the margin of the slug aperture.

2. A method of attaching a metal nut to a deformable sheet wherein the nut is provided with a recessed face portion and a centrally threaded attaching post projecting from the recess and having an exterior surface and a radially enlarged lower portion, comprising the steps of placing said sheet over the outer end of said attaching post, forcing a first hollow die over said end of said post to punch a slug from said sheet to define an aperture, interrupting movement of said first hollow die, moving a second hollow die surrounding said first die to force portions of said sheet adjacent the above mentioned aperture into the recess in the nut face to points adjacent said lower portion of said post, and subsequently resuming movement of said first hollow die to deform metal from the exterior surface only of said post and force such deformed metal into overlying position with respect to said portions of said sheet around the margin of the slug aperture.

3. A method of attaching a metal nut to a panel wherein the nut has a surface defining a load carrying portion surrounding a depression from which a centrally threaded attaching post having a radially enlarged lower portion projects, such method comprising the steps of placing the above mentioned nut surface in face to face relationship with a first side of said panel and supporting the nut, forcing a hollow tool having an internal contour complementary to the contour of the terminal portion of said post against the remote side of said panel in axial alignment with said post to punch a slug from said panel to provide an opening in the panel penetrated by said post and accommodate disposal of the slug into the interior of the hollow tool, imparting continued movement to said tool to deform portions of said panel adjacent the punched opening into the above mentioned depression and by means of such continued tool movement forcing the above mentioned load carrying portion of said nut into abutting relation with the first side of said panel, and utilizing movement of said tool to deform metal from the exterior of the enlarged lower portion only of said post and forcing such deformed metal into overlying relation with the margin of such deformed panel portions surrounding the above mentioned opening to secure the nut to said panel.

4. A method of attaching a metal nut to a panel wherein the nut has a surface defining a load carrying portion surrounding a depression from which a centrally threaded attaching post having a radially enlarged lower portion projects, such method comprising the steps of placing the above mentioned nut surface in face to face relationship with a first side of said panel and supporting the nut, forcing a hollow tool mechanism having an internal contour complementary to the contour of the terminal portion of said post against the remote side of said panel in axial alignment with said post to punch a slug from said panel to provide an opening in the panel penetrated by said post and accommodate disposal of the slug into the interior of the hollow tool mechanism, imparting continued movement to at least a portion of said tool mechanism to deform portions of said panel adjacent the punched opening into the above mentioned depression and by means of such continued movement of said tool portion forcing the above mentioned load carrying portion of said nut into abutting relation with the first side of said panel, and utilizing movement of the portion of said tool mechanism having the above mentioned complementary internal contour to deform metal from the exterior of the enlarged lower portion only of said post and forcing such deformed metal into overlying relation with the margin of such deformed panel portions surrounding the above mentioned opening to secure the nut to said panel.

References Cited by the Examiner

UNITED STATES PATENTS 521,825  6/1894  Shipe.

WHITMORE A. WILTZ, *Primary Examiner.*